(12) United States Patent
Gower et al.

(10) Patent No.: US 7,441,060 B2
(45) Date of Patent: Oct. 21, 2008

(54) SYSTEM, METHOD AND STORAGE MEDIUM FOR PROVIDING A SERVICE INTERFACE TO A MEMORY SYSTEM

(75) Inventors: Kevin C. Gower, LaGrangeville, NY (US); Warren E. Maule, Poughkeepsie, NY (US); Juergen Saalmueller, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/977,921

(22) Filed: Oct. 29, 2004

(65) Prior Publication Data

US 2006/0095629 A1     May 4, 2006

(51) Int. Cl.
*G06F 13/00* (2006.01)
(52) U.S. Cl. .................. 710/110; 365/201; 714/30; 714/42
(58) Field of Classification Search ................. 710/110; 365/201; 714/30, 42; 711/100
See application file for complete search history.

(56) References Cited

U.S. PATENT DOCUMENTS

| 2,842,682 | A |   | 7/1958 | Clapper |
|---|---|---|---|---|
| 3,333,253 | A |   | 7/1967 | Sahulka |
| 3,395,400 | A |   | 7/1968 | De Witt |
| 3,825,904 | A |   | 7/1974 | Burk et al. |
| 4,028,675 | A |   | 6/1977 | Frankenburg ............... 711/106 |
| 4,135,240 | A | * | 1/1979 | Ritchie ....................... 711/164 |
| 4,472,780 | A | * | 9/1984 | Chenoweth et al. ............. 701/4 |
| 4,475,194 | A |   | 10/1984 | LaVallee et al. ............... 371/10 |
| 4,486,739 | A |   | 12/1984 | Franaszek et al. ..... 340/347 DD |
| 4,641,263 | A |   | 2/1987 | Perlman et al. |
| 4,654,857 | A |   | 3/1987 | Samson |
| 4,723,120 | A |   | 2/1988 | Petty, Jr. ................ 340/825.02 |
| 4,740,916 | A |   | 4/1988 | Martin ....................... 364/900 |
| 4,796,231 | A |   | 1/1989 | Pinkham ................ 385/189.05 |
| 4,803,485 | A |   | 2/1989 | Rypinski .................... 370/452 |
| 4,833,605 | A |   | 5/1989 | Terada et al. ................. 364/200 |
| 4,839,534 | A |   | 6/1989 | Clasen ........................ 307/269 |
| 4,943,984 | A |   | 7/1990 | Pechanek et al. ............. 375/109 |

(Continued)

FOREIGN PATENT DOCUMENTS

GB     2396711 A     6/2004

(Continued)

OTHER PUBLICATIONS

IEEE. IEEE Standard Test Access Port and Boundary-Scan Architecture. Jun. 14, 2001. pp. 12-13.*

(Continued)

*Primary Examiner*—Mark Rinehart
*Assistant Examiner*—Matthew D Spittle
(74) *Attorney, Agent, or Firm*—Cantor Colburn LLP; Lynn Augspurger

(57) ABSTRACT

A cascaded interconnect system for providing a service interface to a memory system. The cascaded interconnect system includes a master service interface module, a service interface bus, and one or more slave service interface modules. The master service interface module and the slave interface modules are cascade interconnected via the service interface bus. Each slave service interface module is in communication with a corresponding memory module for providing a service to the memory module.

8 Claims, 15 Drawing Sheets

TYPICAL LARGE-SYSTEM MEMORY CONFIGURATION

U.S. PATENT DOCUMENTS

| | | | |
|---|---|---|---|
| 4,985,828 A | 1/1991 | Shimizu et al. | |
| 5,053,947 A | 10/1991 | Heibel et al. | 364/200 |
| 5,177,375 A * | 1/1993 | Ogawa et al. | 327/143 |
| 5,206,946 A | 4/1993 | Brunk | 710/2 |
| 5,214,747 A | 5/1993 | Cok | 395/27 |
| 5,265,049 A | 11/1993 | Takasugi | 365/189.01 |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | |
| 5,475,690 A | 12/1995 | Burns et al. | 370/105.3 |
| 5,513,135 A | 4/1996 | Dell et al. | 365/52 |
| 5,522,064 A | 5/1996 | Aldereguia et al. | |
| 5,544,309 A * | 8/1996 | Chang et al. | 714/30 |
| 5,546,023 A * | 8/1996 | Borkar et al. | 326/93 |
| 5,561,826 A | 10/1996 | Davies et al. | |
| 5,592,632 A | 1/1997 | Leung et al. | 395/306 |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A * | 8/1997 | Rondeau et al. | 365/63 |
| 5,666,480 A | 9/1997 | Leung et al. | 395/180 |
| 5,684,418 A | 11/1997 | Yanagiuchi | |
| 5,764,155 A | 6/1998 | Kertesz et al. | 340/825.08 |
| 5,822,749 A | 10/1998 | Agarwal | |
| 5,852,617 A * | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | |
| 6,170,059 B1 | 1/2001 | Pruett et al. | |
| 6,173,382 B1 | 1/2001 | Dell et al. | 711/170 |
| 6,185,718 B1 | 2/2001 | Dell et al. | |
| 6,215,686 B1 | 4/2001 | Deneroff et al. | 365/52 |
| 6,219,288 B1 * | 4/2001 | Braceras et al. | 365/201 |
| 6,219,760 B1 | 4/2001 | McMinn | |
| 6,260,127 B1 | 7/2001 | Olarig et al. | 711/167 |
| 6,262,493 B1 * | 7/2001 | Garnett | 307/64 |
| 6,292,903 B1 | 9/2001 | Coteus et al. | 713/401 |
| 6,301,636 B1 | 10/2001 | Schultz et al. | 711/108 |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,357,018 B1 | 3/2002 | Stuewe et al. | |
| 6,370,631 B1 | 4/2002 | Dye | |
| 6,378,018 B1 | 4/2002 | Tsern et al. | 710/129 |
| 6,381,685 B2 | 4/2002 | Dell et al. | |
| 6,393,528 B1 | 5/2002 | Arimilli et al. | |
| 6,408,398 B1 | 6/2002 | Frecker et al. | |
| 6,446,174 B1 | 9/2002 | Dow | |
| 6,467,013 B1 | 10/2002 | Nizar | |
| 6,473,836 B1 | 10/2002 | Ikeda | |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Windmer | 375/242 |
| 6,496,910 B1 | 12/2002 | Baentsch et al. | |
| 6,499,070 B1 | 12/2002 | Whetsel | 710/71 |
| 6,502,161 B1 * | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | 710/306 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | |
| 6,587,912 B2 | 7/2003 | Leddige et al. | |
| 6,590,827 B2 | 7/2003 | Chang et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,611,905 B1 | 8/2003 | Grundon et al. | 711/167 |
| 6,622,217 B2 | 9/2003 | Gharachorloo et al. | 711/141 |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,938,119 B2 | 8/2005 | Kohn et al. | |
| 6,944,084 B2 | 9/2005 | Wilcox | |
| 6,949,950 B2 | 9/2005 | Takahaski et al. | |
| 6,977,536 B2 | 12/2005 | Chin-Chich et al. | 327/116 |
| 6,993,612 B2 | 1/2006 | Porterfield | |
| 7,039,755 B1 | 5/2006 | Helms | |
| 7,076,700 B2 | 7/2006 | Rieger | |
| 7,133,790 B2 | 11/2006 | Liou | |
| 7,133,972 B2 | 11/2006 | Jeddeloh | |
| 7,177,211 B2 * | 2/2007 | Zimmerman | 365/201 |
| 7,206,962 B2 | 4/2007 | Deegan | |
| 7,216,196 B2 | 5/2007 | Jeddeloh | |
| 7,266,634 B2 | 9/2007 | Ware et al. | |
| 7,321,979 B2 | 1/2008 | Lee | |
| 2001/0000822 A1 | 5/2001 | Dell et al. | 711/170 |
| 2001/0003839 A1 | 6/2001 | Kondo | |
| 2001/0029566 A1 | 10/2001 | Woo | |
| 2002/0019926 A1 | 2/2002 | Huppenthal et al. | 712/15 |
| 2002/0038405 A1 | 3/2002 | Leddige et al. | |
| 2002/0059439 A1 | 5/2002 | Arroyo et al. | |

| | | | |
|---|---|---|---|
| 2002/0083255 A1 | 6/2002 | Greeff et al. ............... 710/305 |
| 2002/0103988 A1 | 8/2002 | Dornier |
| 2002/0112119 A1 | 8/2002 | Halbert et al. |
| 2002/0112194 A1 | 8/2002 | Uzelac ....................... 713/500 |
| 2002/0124195 A1 | 9/2002 | Nizar |
| 2002/0124201 A1 | 9/2002 | Edwards et al. |
| 2002/0147898 A1 | 10/2002 | Rentschler et al. |
| 2002/0174274 A1 | 11/2002 | Wu et al. |
| 2003/0028701 A1 | 2/2003 | Rao et al. |
| 2003/0033364 A1 | 2/2003 | Garnert et al. ............. 709/203 |
| 2003/0051055 A1 | 3/2003 | Parrella et al. |
| 2003/0056183 A1 | 3/2003 | Kobayahi |
| 2003/0084309 A1 | 5/2003 | Kohn .......................... 713/189 |
| 2003/0090879 A1 | 5/2003 | Doblar et al. ............... 361/728 |
| 2003/0105938 A1 | 6/2003 | Cooksey et al. |
| 2003/0126363 A1 | 7/2003 | David |
| 2003/0223303 A1 | 12/2003 | Lamb et al. ............. 365/230.06 |
| 2003/0236959 A1 | 12/2003 | Johnson et al. ............. 711/167 |
| 2004/0006674 A1 | 1/2004 | Hargis et al. ................ 711/156 |
| 2004/0049723 A1 | 3/2004 | Obara ........................ 714/729 |
| 2004/0098549 A1 | 5/2004 | Dorst |
| 2004/0117588 A1 | 6/2004 | Arimilli et al. |
| 2004/0128474 A1 | 7/2004 | Vorbach ....................... 712/10 |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. |
| 2004/0246767 A1 | 12/2004 | Vogt ........................... 365/154 |
| 2004/0260909 A1 | 12/2004 | Lee et al. |
| 2004/0260957 A1 | 12/2004 | Jeddeloh et al. |
| 2005/0023560 A1 | 2/2005 | Ahn et al. .................... 257/200 |
| 2005/0033906 A1 | 2/2005 | Mastronarde et al. |
| 2005/0044305 A1 | 2/2005 | Jakobs et al. |
| 2005/0044457 A1* | 2/2005 | Jeddeloh ..................... 714/718 |
| 2005/0050237 A1 | 3/2005 | Jeddeloh |
| 2005/0050255 A1 | 3/2005 | Jeddeloh |
| 2005/0066136 A1 | 3/2005 | Schnepper |
| 2005/0071542 A1 | 3/2005 | Weber et al. |
| 2005/0080581 A1 | 4/2005 | Zimmerman et al. |
| 2005/0086441 A1 | 4/2005 | Myer et al. |
| 2005/0097249 A1* | 5/2005 | Oberlin et al. .............. 710/100 |
| 2005/0120157 A1 | 6/2005 | Chen et al. .................. 710/313 |
| 2005/0125702 A1 | 6/2005 | Huang et al. |
| 2005/0125703 A1 | 6/2005 | Lefurgy et al. |
| 2005/0138246 A1 | 6/2005 | Chen et al. |
| 2005/0138267 A1* | 6/2005 | Bains et al. .................. 711/100 |
| 2005/0144399 A1 | 6/2005 | Hosomi |
| 2005/0149665 A1 | 7/2005 | Wolrich et al. |
| 2005/0166006 A1 | 7/2005 | Talbot et al. |
| 2005/0177677 A1 | 8/2005 | Jeddeloh |
| 2005/0177690 A1 | 8/2005 | LaBerge |
| 2005/0204216 A1* | 9/2005 | Daily et al. ................. 714/724 |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh |
| 2005/0259496 A1 | 11/2005 | Hsu et al. |
| 2005/0289377 A1 | 12/2005 | Luong |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0107175 A1 | 5/2006 | Dell et al. |
| 2006/0161733 A1 | 7/2006 | Beckett et al. |
| 2006/0195631 A1 | 8/2006 | Rajamani |
| 2006/0288172 A1 | 12/2006 | Lee et al. |
| 2007/0025304 A1 | 2/2007 | Leelahakriengkrai et al. |

| | | | |
|---|---|---|---|
| 2007/0160053 A1 | 7/2007 | Coteus |

FOREIGN PATENT DOCUMENTS

| | | |
|---|---|---|
| JP | 59153353 A | 9/1984 |
| JP | 04326140 A | 11/1992 |
| JP | 10011971 | 1/1998 |
| WO | WO2005038660 | 4/2005 |

OTHER PUBLICATIONS

IBM. IBM WebSphere Enterprise Service Bus. Version 6.0.2. 2006.*
BEA Systems, Inc. Integration of Clustered BEA AquaLogic Service Bus Domain and Remote Tibco Enterprise Message Service 4.2.0 for Messaging Application in SOA. BEA White paper. 2006.*
Oracle. Oracle Enterprise Service Bus. Oracle Data Sheet. Oct. 2006.*
Brown, et al "Compiler-Based I/O Prefetching for Out-of-Core Applications", ACM Transactions on Computer Systems, vol. 19, No. 2, May 2001, pp. 111-170.
Wang, et al "Guided Region Prefetching: A Cooperative Hardware/Software Approach", pp. 388-398.
Natarajan, et al "A Study of Performance Impact of Memory Controller Features in Multi-Processor Server Environment", pp. 80-87.
Nilsen, "High-Level Dynamic Memory Management for Object-Oriented Real-Time Systems", pp. 86-93.
Sivencrona et al.; "RedCAN™: Simulations of two Fault Recovery Algorithms for CAN;" Proceedings for the 10th IEEE Pacific Rim International Symposium on Dependable Computing (PRDC'04); 2005.
Jungjoon Kim et al.; "Performance and Architecture Features of Segmented Multiple Bus System;" IEEE Computer Society; 1999 International Conference on Parallel Processing (ICPP '99).
Ghoneima et al.; "Optimum Positioning of Interleaved Reapeaters in Bidirectional Buses;" IEEE Transactions on Computer-Aided Design of Integrated Ciruciuts and Systems, vol. 25, No. 3, Mar. 2005, pp. 461-469.
Seceleanu et al.; "Segment Arbiter as Action System;" IEEE 2003 pp. 249-252.
Benini, Luca, et al. "System-Level Power Optimization: Techniques and Tools", ACM Transactions on Design Automation of Electronic Systems, vol. 6, No. 2, Apr. 2001, pp. 149-206.
Boudon, et al., "Novel Bus Reconfiguration Scheme With Spare Lines", IBM Technical Disclosure Bulletin, May 1987, vol. 29, No. 12, pp. 1-3.
Massoud Pedram, "Power Minimization in IC Design Principles and Applications", ACM Transactions on Design Automation of Electronic Systems vol. 1, No. 1, Jan. 1996, pp. 3-56.
NB940259 (IBM Technical Disclosure Bulletin, Feb. 1994; vol. 37; pp. 59-64).
P.R. Panda, "Data and Memory Optimization Techniques For Embedded Systems", ACM Transactions on Design Automation of Electronic Systems, vol. 6, No. 2, Apr. 2001, pp. 149-206.
Singh, S., et al., "Bus Sparing for Fault-Tolerant System Design", IBM Technical Disclosure Bulletin, Dec. 1991, vol. 34, No. 71, pp. 117-118.
U.S. Appl. No. 11/419,586, filed May 22, 2006. Robert Tremaine. "Systems and Methods for Providing Remote Pre-Fetch Buffers".
Wikipedia, Serial Communications, [online], [retrieved Apr. 10, 2007 from the Internet], http://en.wikipedia.org/wiki/Serial_communications,p. 1.
IEEE, "IEEE Standard Test Access Port and Boundary-Scan Architecture", Jul. 23, 2001, IEEE Std 1149-1-2001, pp. 11-13.
Rosenberg, "Dictionary of Computers, Information Processing & Telecommuications", Second Edition, John Wiley & Sons, Inc. 1987. 3 pgs.
PCT International Search Report PCT/EP2006/068984. Mailed Feb. 16, 2007.
PCT International Search Report PCT/EP2007/057916. Mailed Dec. 14, 2007.
PCT Search Report PCT/EP2007/057915. Mailed Nov. 7, 2007.

* cited by examiner

| DOWNSTREAM | | | | | | | | | | | | | | | FORMAT: 9 DATA – 8 CMD – 4 ECC – 1 SPARE – 1 DIFF CLK = 24 WIRES | | | | | | | |
|---|---|---|---|---|---|---|---|---|---|---|---|---|---|---|---|---|---|---|---|---|---|---|
| s3_us(#)<br>d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Xfer/Bit | SPARE | ECC0 | ECC1 | ECC2 | ECC3 | DI0 | DI1 | DI2 | DI3 | DI4 | DI5 | DI6 | DI7 | DI8 | C0 | C1 | C2 | C3 | C4 | C5 | C6 | C7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C66 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C67 |

SPARE BITS 1202

E: ECC CHECK BITS 1204

D: WRITE DATA BITS 1206

C: COMMAND BITS 1208

FIG. 12

SYSTEM, METHOD AND STORAGE MEDIUM FOR PROVIDING A SERVICE INTERFACE TO A MEMORY SYSTEM

BACKGROUND OF THE INVENTION

The invention relates to a memory system and, in particular, to providing a service interface to a memory system.

Computer memory subsystems have evolved over the years but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, memory interface chips 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, a serial electrically erasable programmable read-only memory (SEEPROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723, 120. A memory controller 111 is connected to a memory bus 315, which further connects to a module 310a. The information on bus 315 is re-driven by the buffer on module 310a to a next module, 310b, which further re-drives the bus 315 to module positions denoted as 310n. Each module 310a includes a DRAM 311a and a buffer 320a. The bus 315 may be described as having a daisy chain structure with each bus being point-to-point in nature.

One drawback to the use of a daisy chain bus is associated with powering up, configuring and initializing the devices on the memory modules in the daisy chain. These devices typically require initialization instructions to perform such tasks as providing configuration information and to perform high speed memory bus interface training and optimization sequences. A service interface, which is available early in the power on reset sequence because it does not require an interface training and optimization procedure, can be used for these tasks. Because the number of memory modules on the daisy chain may vary, powering up, configuring and initializing must be able to handle a variable number of memory modules. A typical ring connected service interface topology (e.g., a joint test action group (JTAG) interface) may not support a variable number of plugged components without expensive, external multiplexing. In addition to a service interface that can handle a variable number of plugged components, it would be desirable for powering up, configuring and initializing to be performed efficiently and with high reliability.

BRIEF SUMMARY OF THE INVENTION

Exemplary embodiments of the present invention include a cascaded interconnect system for providing a service interface to a memory system. The cascaded interconnect system includes a master service interface module, a service interface bus, and one or more slave service interface modules. The master service interface module and the slave interface modules are cascade interconnected via the service interface bus. Each slave service interface module is in communication with a corresponding memory module for providing a service to the memory module.

Additional exemplary embodiments include a method for providing a service interface to a memory subsystem. The method includes receiving an input signal at a slave service interface module. The slave service interface module is included in a cascaded interconnect system that includes a master service interface module and one or more slave service interface modules that are interconnected by a service interface bus. In addition, the slave service interface module corresponds to a memory module. The input signal is transmitted in response to the receiving and a service is provided to the memory module in response to the input signal.

Further exemplary embodiments include a storage medium for providing a service interface to a memory subsystem. The storage medium is encoded with machine readable computer program code for causing a computer to implement a method. The method includes receiving an input signal at a slave service interface module. The slave service interface module is included in a cascaded interconnect system that includes a master service interface module and one or more slave service interface modules that are interconnected by a service interface bus. In addition, the slave service interface module corresponds to a memory module. The input signal is transmitted in response to the receiving and a service is provided to the memory module in response to the input signal.

BRIEF DESCRIPTION OF THE DRAWINGS

Referring now to the drawings wherein like elements are numbered alike in the several FIGURES:

FIG. 12 depicts a downstream frame format that is utilized by exemplary embodiments of the present invention;

DETAILED DESCRIPTION OF THE PREFERRED EMBODIMENTS

Exemplary embodiments of the present invention include a cascaded interconnect service interface for a memory system. The service interface may be utilized for high performance and high reliability power on reset and initialization in a cascaded memory module structure.

Figure 1:
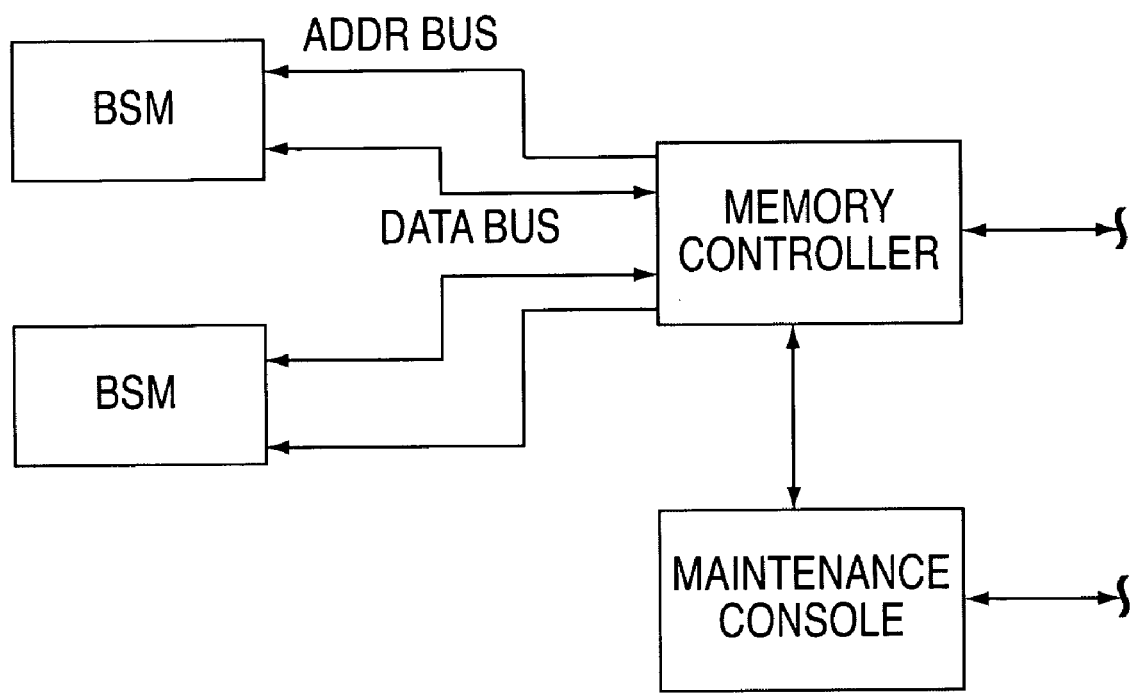
FIG. 1 depicts a prior art memory controller connected to two buffered memory assemblies via separate point-to-point links.
Figure 2:
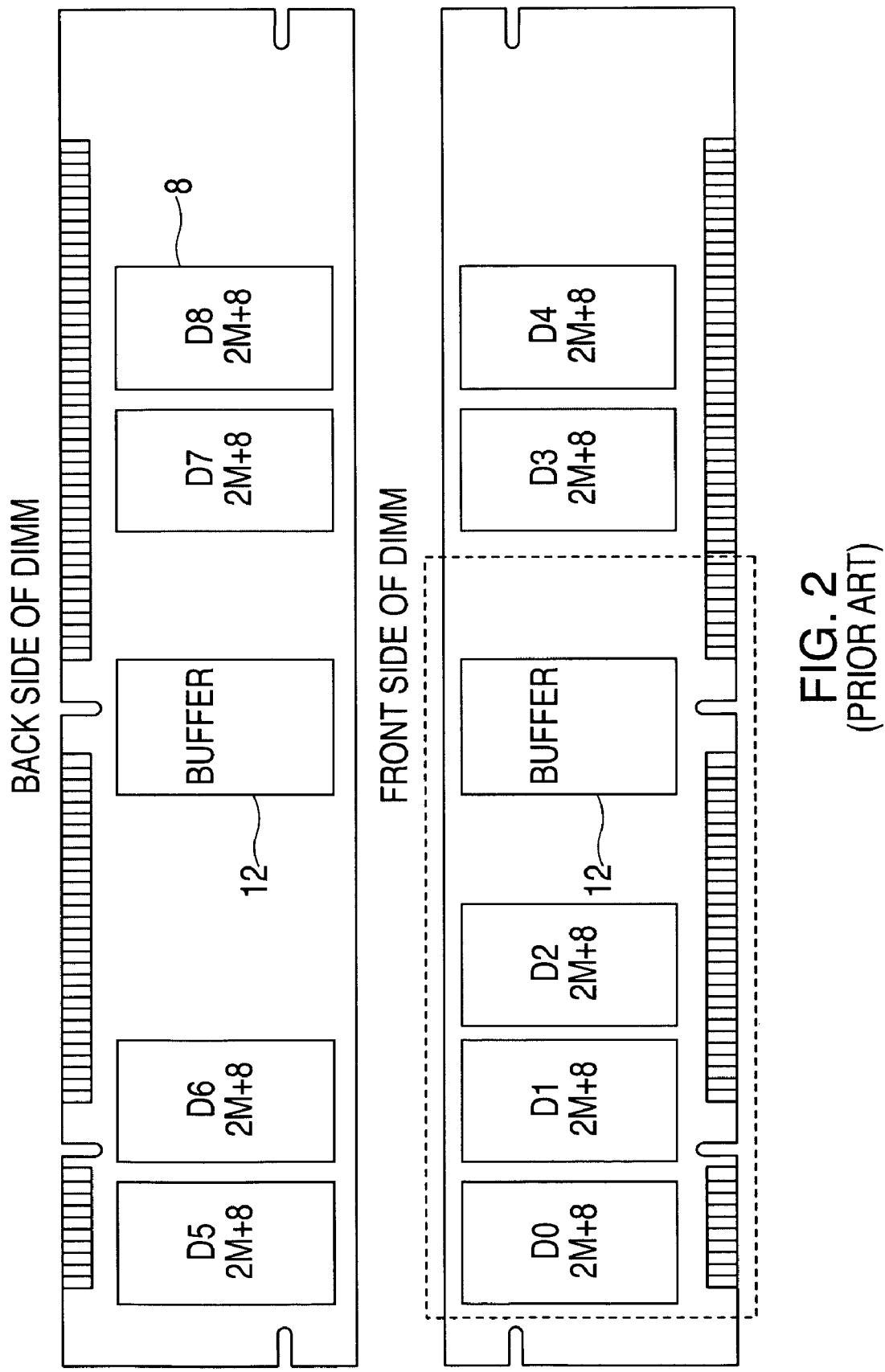
FIG. 2 depicts a prior art synchronous memory module with a memory interface chip.
Figure 3:
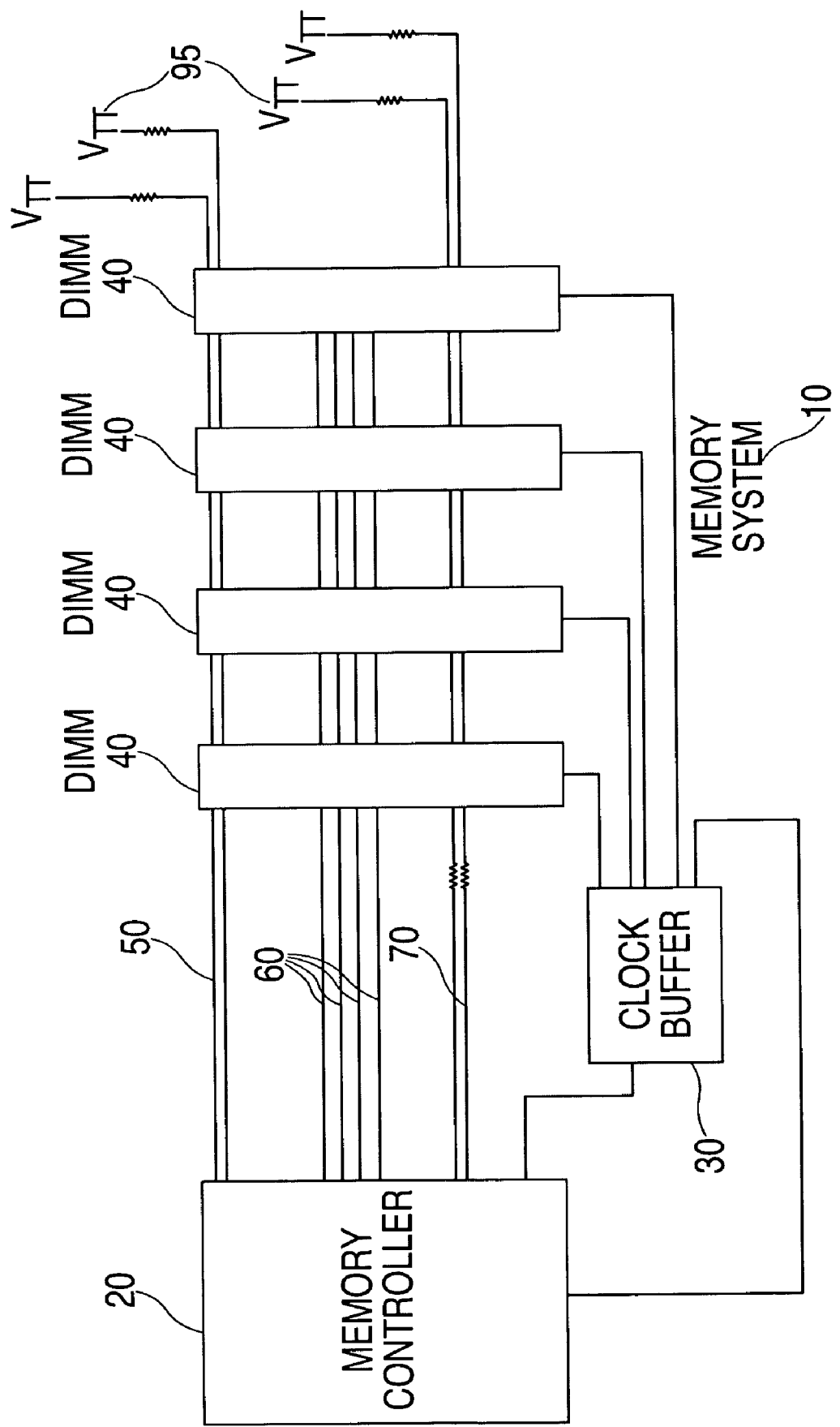
FIG. 3 depicts a prior art memory subsystem using registered DIMMs.
Figure 4:
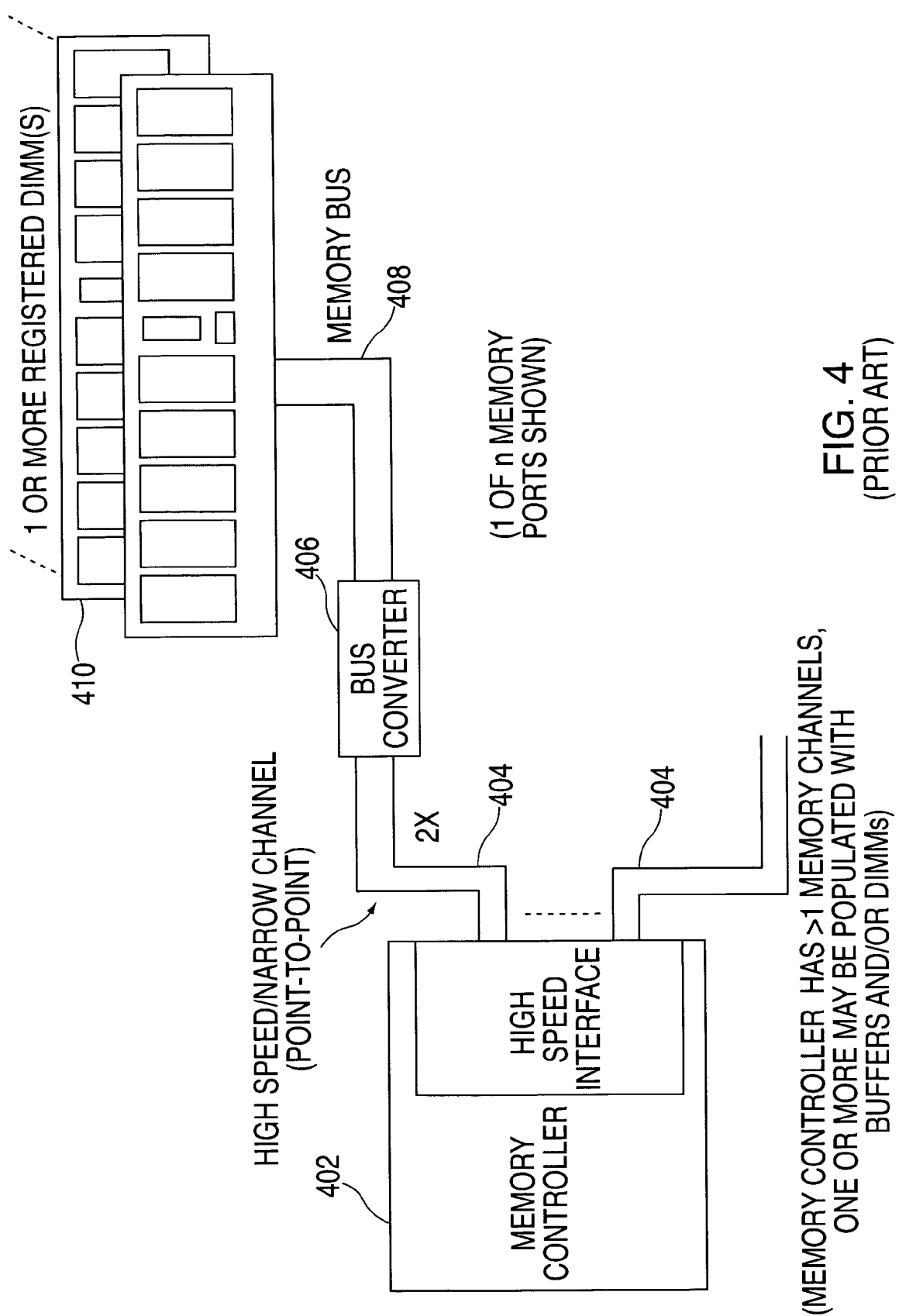
FIG. 4 depicts a prior art memory subsystem with point-to-point channels, registered DIMMs, and a 2:1 bus speed multiplier.
Figure 8:
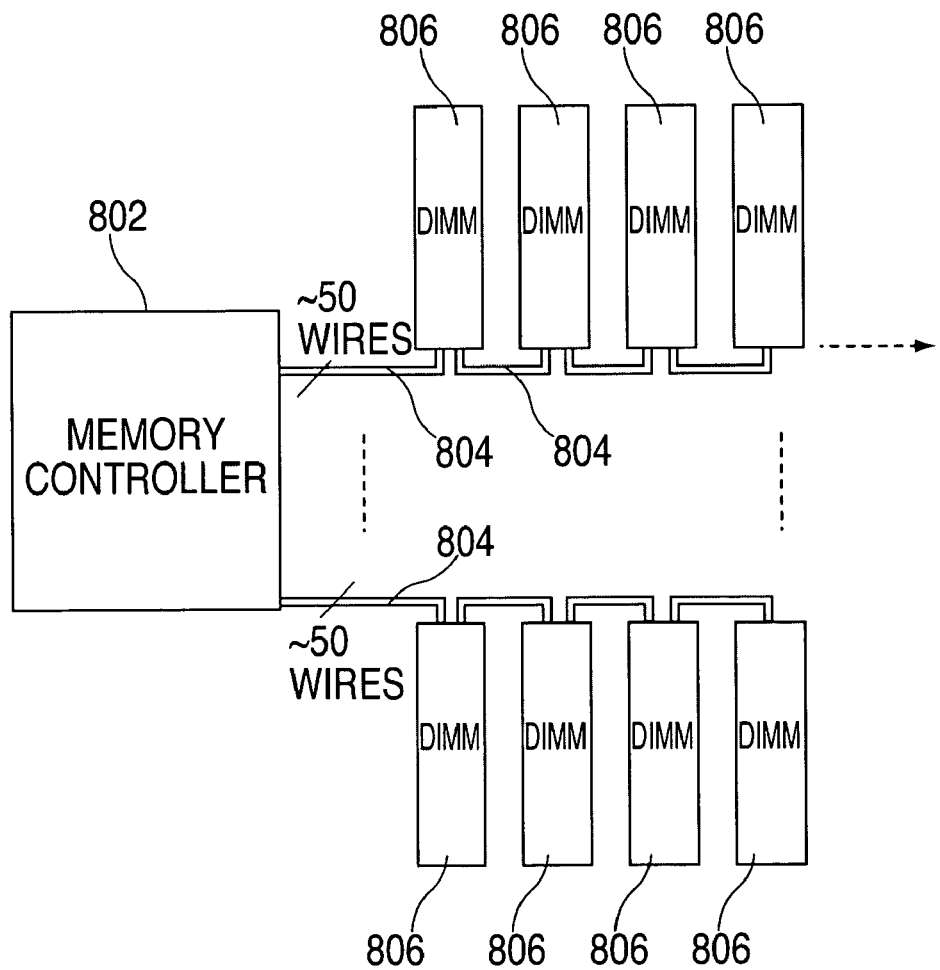
FIG. 8 depicts a cascaded memory structure that is utilized by exemplary embodiments of the present invention.

FIG. 8 depicts a cascaded memory structure that may be utilized with exemplary embodiments of the power on reset and initialization described herein. This memory structure includes a memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module to permit memory modules to be cascaded such that each memory module is interconnected to other memory modules, as well as to the memory controller 802.

Figure 9:
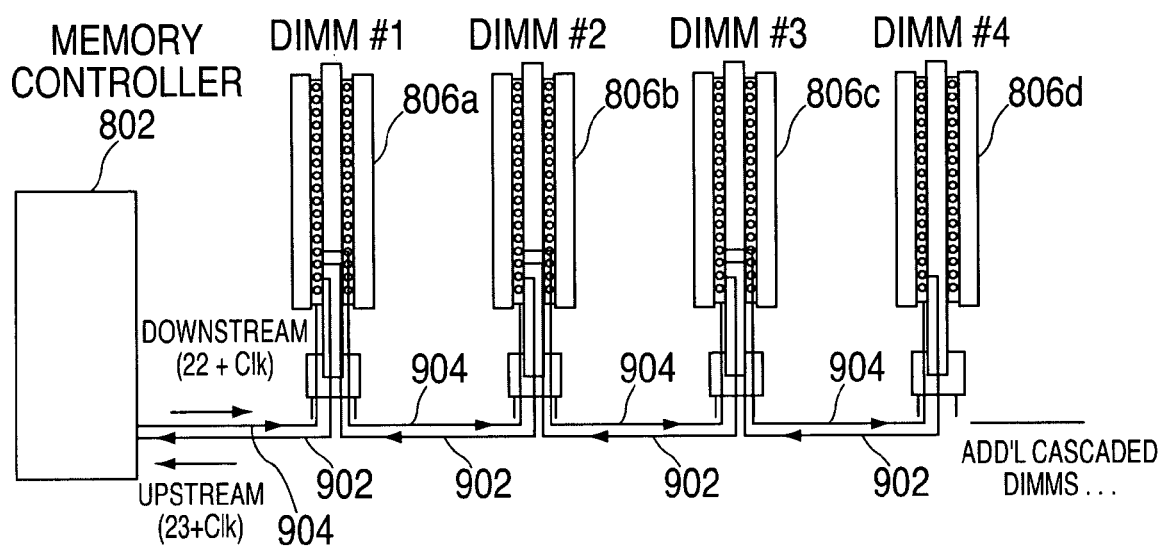
FIG. 9 depicts a memory structure with cascaded memory modules and unidirectional busses that is utilized by exemplary embodiments of the present invention.

FIG. 9 depicts a memory structure with cascaded memory modules and unidirectional busses that is utilized by exemplary embodiments of the present invention. One of the functions provided by the memory modules 806 in the cascade structure is a re-drive function to send signals on the memory bus to other memory modules 806 or to the memory controller 802. FIG. 9 includes the memory controller 802 and four memory modules 806a, 806b, 806c and 806d, on each of two memory busses (a downstream memory bus 904 and an upstream memory bus 902), connected to the memory controller 802 in either a direct or cascaded manner. Memory module 806a is connected to the memory controller 802 in a direct manner. Memory modules 806b, 806c and 806d are connected to the memory controller 802 in a cascaded manner.

An exemplary embodiment of the present invention includes two uni-directional busses between the memory controller 802 and memory module 806a ("DIMM #1"), as well as between each successive memory module 806-d ("DIMM #2", "DIMM #3" and "DIMM #4") in the cascaded memory structure. The downstream memory bus 904 is comprised of twenty-two single-ended signals and a differential clock pair. The downstream memory bus 904 is used to transfer address, control, write data and bus-level error code correction (ECC) bits downstream from the memory controller 802, over several clock cycles, to one or more of the memory modules 806 installed on the cascaded memory channel. The upstream memory bus 902 is comprised of twenty-three single-ended signals and a differential clock pair and is used to transfer read data and bus-level ECC bits upstream from the sourcing memory module 806 to the memory controller 802. Because the upstream memory bus 902 and the downstream memory bus 904 are unidirectional and operate independently, read data, write data and memory commands may be transmitted simultaneously. This increases effective memory subsystem bandwidth and may result in higher system performance. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Figure 10:
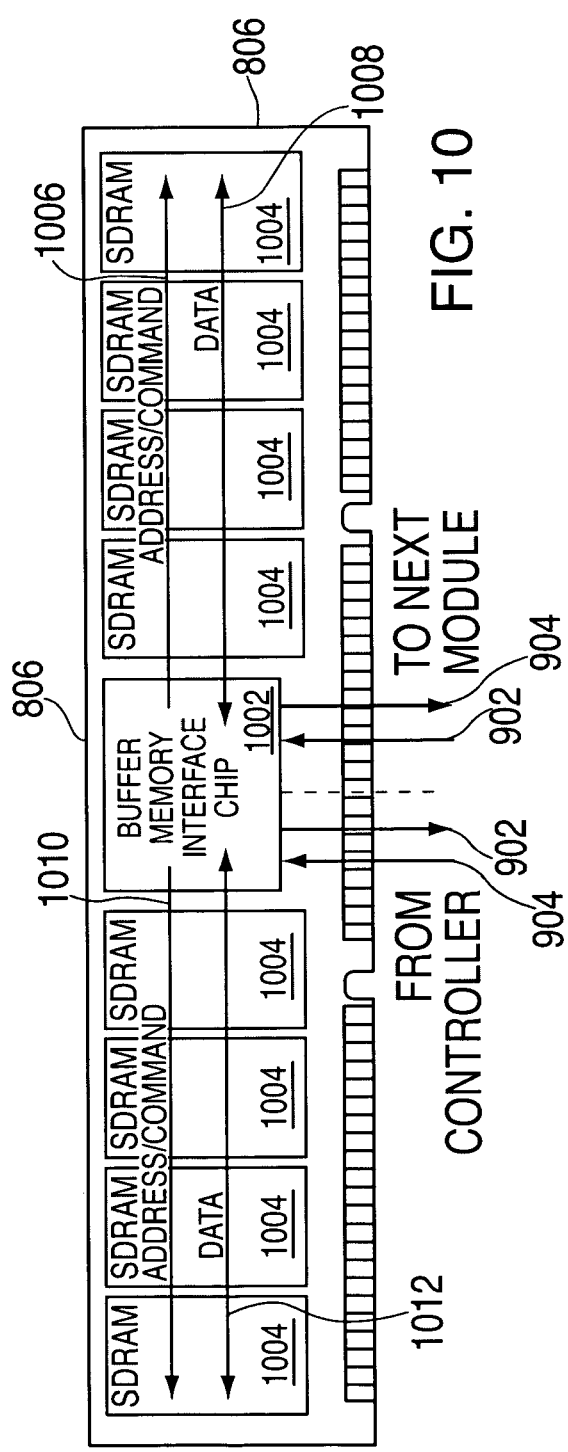
FIG. 10 depicts a buffered module wiring system that is utilized by exemplary embodiments of the present invention.

FIG. 10 depicts a buffered module wiring system that is utilized by exemplary embodiments of the present invention. FIG. 10 is a pictorial representation of a memory module with arrows representing the primary signal flows. The signal flows include the upstream memory bus 902, the downstream memory bus 904, memory device address and command busses 1010 and 1006, and memory device data busses 1012 and 1008. In an exemplary embodiment of the present invention, a memory interface chip 1002, also referred to as a memory interface chip, provides two copies of the address and command signals to the memory devices 1004 (e.g. synchronous DRAMs (SDRAMs)) with the right memory device address and command bus 1006 exiting from the right side of the memory interface chip 1002 for the memory devices 1004 located to the right side and behind the memory interface chip 1002 on the right. The left memory device address and command bus 1010 exits from the left side of the memory interface chip 1002 and connects to the memory devices 1004 to the left side and behind the memory interface chip 1002 on the left. Similarly, the data bits intended for memory devices 1004 to the right of the memory interface chip 1002 exit from the right of the memory interface chip 1002 on the right memory device data bus 1008. The data bits intended for the left side of the memory interface chip 1002 exit from the left of the memory interface chip 1002 on the left memory device data bus 1012. The high speed upstream memory bus 902 and downstream memory bus 904 exit from the lower portion of the memory interface chip 1002, and connect to a memory controller or other memory modules either upstream or downstream of this memory module 806, depending on the application. The memory interface chip 1002 receives signals that are four times the memory module data rate and converts them into signals at the memory module data rate.

Figure 5:
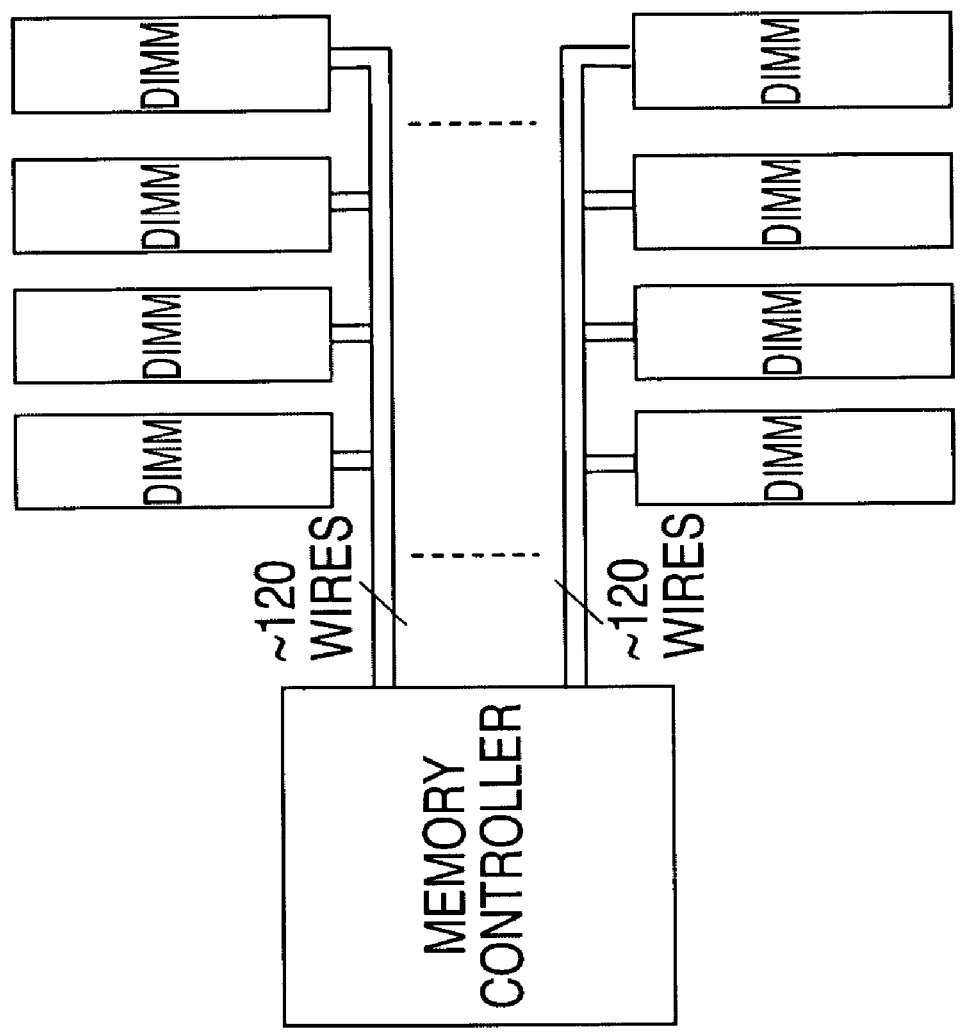
FIG. 5 depicts a prior art memory structure that utilizes a multidrop memory 'stub' bus.
Figure 6:
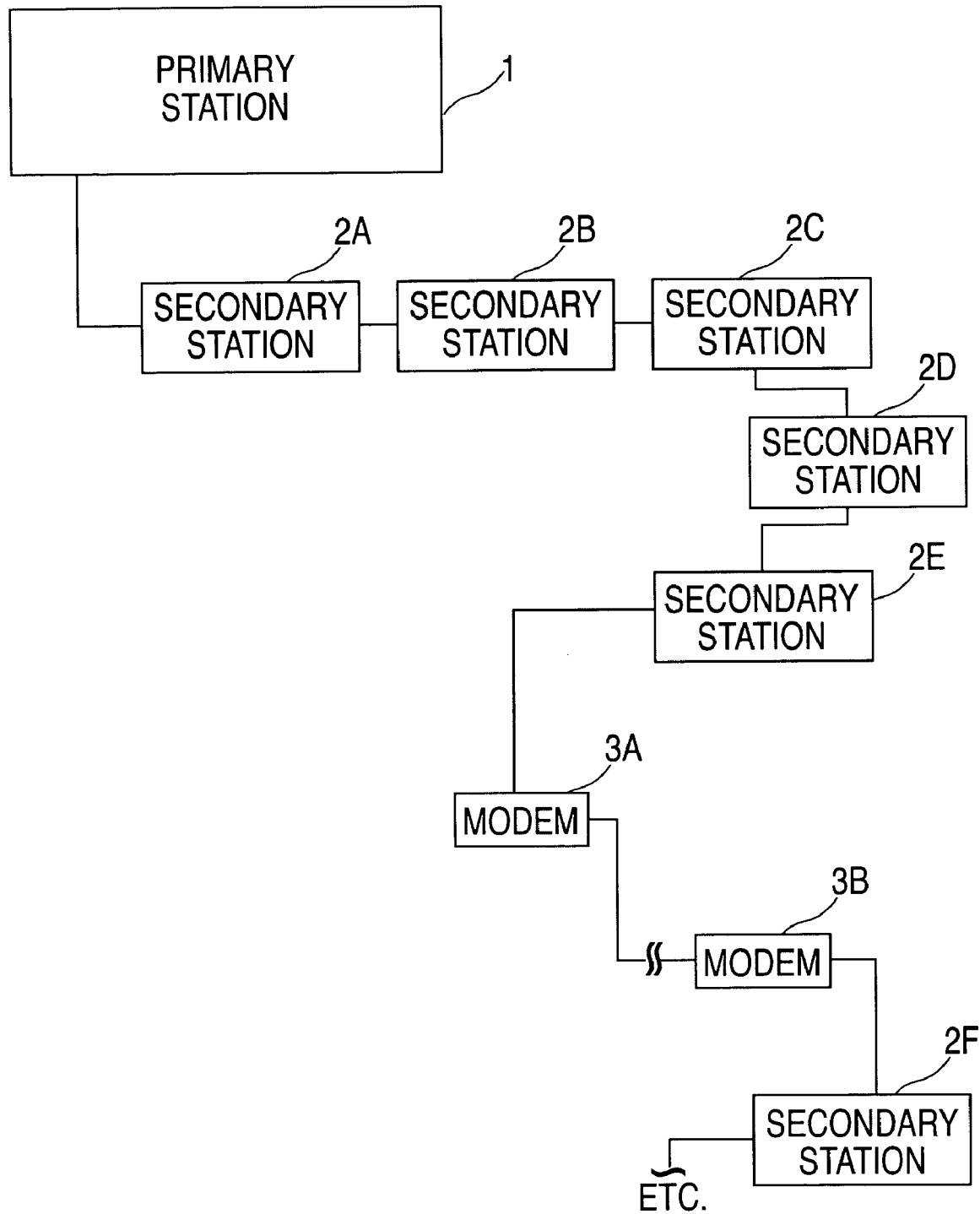
FIG. 6 depicts a prior art daisy chain structure in a multi-point communication structure that would otherwise require multiple ports.
Figure 7:
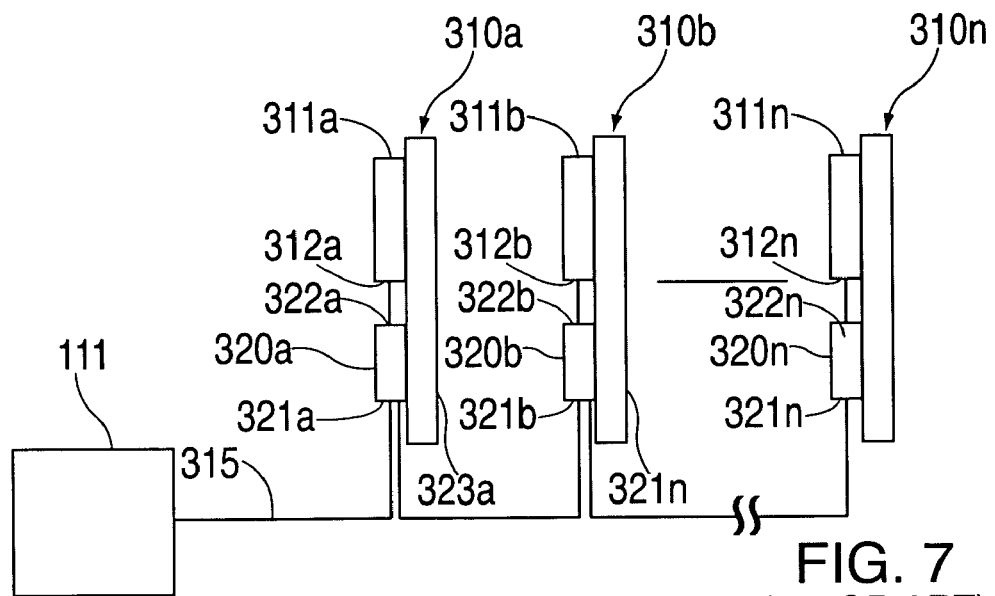
FIG. 7 depicts a prior art daisy chain connection between a memory controller and memory modules.
Figure 11:
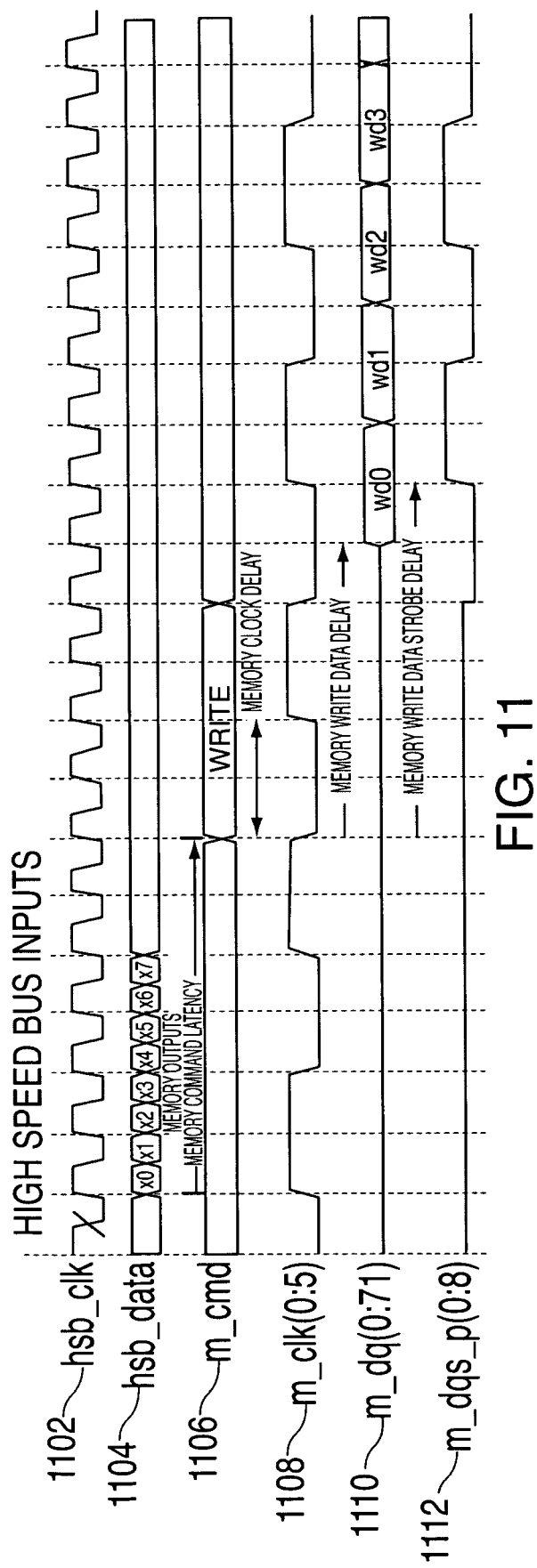
FIG. 11 depicts bus and DRAM timing diagrams showing the four to one bus speed multiplier that is utilized by exemplary embodiments of the present invention.

FIG. 11 depicts bus and SDRAM timing diagrams showing the four to one bus speed multiplier that is utilized by exemplary embodiments of the present invention. FIG. 11 is a simplified "write" timing diagram that demonstrates the bus timing relationships for a write cycle in the preferred embodiment. The same approach may be taken for other cycles, such as a read cycle. A high speed bus clock (hsb_clk) 1102 is the notation for the positive side of the differential clock that travels with the high speed data traveling downstream from the memory controller 802 to the first memory module 806, or DIMM. Even though the hsb_clk 1102 is shown as being single-ended, in exemplary embodiments of the present invention, a differential clock is utilized to reduce clock sensitivity to external noise and coupling. A high speed data signal (hsb_data) 1104 shows a burst of eight transfers, operating at a double data rate speed (i.e., data is valid on both edges of the clock), which in this example constitutes a single frame of address, command and data to the first memory module 806 position. With the aforementioned downstream bus width of twenty-two bits, and the burst of eight, a full frame can constitute up to one hundred and seventy-six unique bits, depending on the assignment or use of these bits and the actual wires on the bus. This width is more than adequate to provide the approximately one hundred and twenty memory signals defined as being required by the memory module in FIG. 5, thereby enabling additional information to be included in the frame to further enhance overall system reliability, fault survivability and/or performance.

Also as shown in FIG. 11, the eight bits occur over four of the hsb_clk cycle times, at which point this example shows no further activity on the high speed bus. A local memory clock (m_clk) 1108 on the memory module 806 is derived from the hsb_clk 1102, and is shown as a single-ended signal m_clk (0:5) operating at one quarter the frequency of the hsb_clk 1102. Although shown as a single-ended clock, in an exemplary embodiment of the present invention, the m_clk 1108 would also operate as a differential clock. The decoded memory command signifying a 'write' operation to double data rate (DDR2) memory devices, or SDRAMS 1004 on the memory module 806, is shown on the signal labeled m_cmd 1106. This command is decoded from the high speed bus and is driven by the buffer to the DDR2 memory devices 1004 to ensure arrival at the memory devices 1004 prior to the rising edge of the clock at the memory devices 1004. The seventy-two bits of data written to the DDR2 memory devices 1004 is shown as m_dq(0:71) 1110, and is shown arriving at the memory devices 1004 one full memory clock after the write command is decoded, as a DDR signal relative to the m_clk 1108. In an exemplary embodiment of the present invention, the data, or m_dq(0:71) 1110 is single ended. The nine DDR data strobes (m_dqs_p) 1112 are also shown, as single ended signals, switching one quarter of a clock cycle prior to the DDR2 memory devices 1004, thereby ensuring that the strobe switches approximately in the center of each valid write data bit. In an exemplary embodiment of the present invention, the m_dqs_p 1112 is differential. This diagram demonstrates a burst of four data bits to the memory devices 1004 (wdb0 through wdb3), with seventy-two bits of memory data being provided to the memory devices every memory clock cycle. In this manner, the data rate of the slower memory modules 806 is matched to the high-speed memory bus that operates at four times the speed of the memory modules.

FIG. 12 depicts a downstream frame format that is utilized by exemplary embodiments of the present invention to transfer information downstream from the memory controller 802 to the memory modules 806. In an exemplary embodiment of the present invention, the downstream frame consists of eight transfers, with each transfer including twenty-two signals and a differential clock (twenty-four wires total). The frame further consists of eight command wires (c0 through c7) 1208, nine data wires (di0 through di8) 1206, four bus ECC (Error Correcting Code) wires (ecc0 through ecc3) 1204 and a spare wire (spare) 1202. The seventy-two data bits referenced in the timing diagram of FIG. 11 are shown in FIG. 12 as bits di0 through di8, and consist of nine wires with eight transfers on each wire for each frame. The numbering of each data bit, as well as for other bits, is based on the wire used, as well as the specific transfer. D34 refers to data bit 3 (of bits 0 through 8)

and transfer 4 (of transfer 0 through 7). The command bit field is shown as c0 through c7 and consists of sixty-four bits of information provided to the module over eight transfers. The ECC bit field (ecc0 through ecc3) consists of thirty-two bit positions over eight transfers but is actually formatted in groups of sixteen bits. Each sixteen bit packet consists of four transfers over each of the four wires and provides the bus level fault detection and correction across each group of 4 bus transfers. The spare bit position may be used to logically replace any of the twenty-one wires, also defined as bitlanes, used to transfer bits in the command, data and ECC fields, should a failure occur in one of those bitlanes that results in errors that exceed a system-assigned failure threshold limit. Using this exemplary embodiment of the present invention provides that out of the one hundred and seventy-six possible bit positions, one hundred and sixty-eight are available for the transfer of information to the memory module 806, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module 806.

A service interface for communicating power on reset and initialization commands to cascaded memory systems, such as the ones depicted in FIGS. 8-10, is provided by exemplary embodiments of the present invention. Because of its support function on field replaceable units (FRUs), the dedicated interface is referred to herein as the FRU service interface (FSI). Like the high speed busses that form the memory controller interface (i.e., the upstream memory bus 902 and the downstream memory bus 904) in a cascaded memory structure, the FSI uses a cascaded architecture in which the FSI signals are received by memory modules 806 upstream (towards the memory controller) and repowered downstream.

Figure 13:
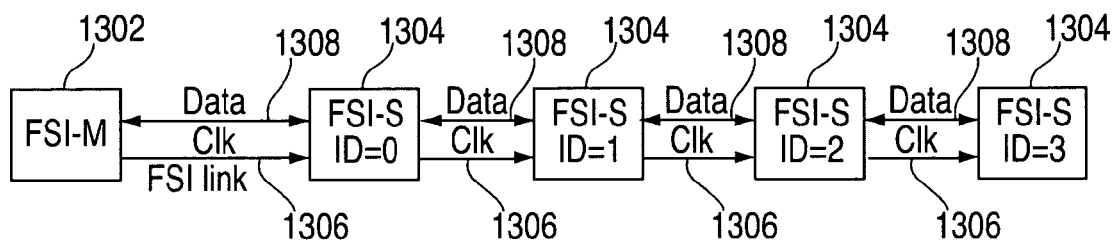
FIG. 13 depicts a cascaded service interface that may be utilized by exemplary embodiments of the present invention.

FIG. 13 depicts a cascaded service interface for power on reset and initialization system that may be utilized by exemplary embodiments of the present invention. A master version of the FSI (FSI-M) 1302 resides external to the memory modules 806 and connects to the slave version of the FSI (FSI-S) 1304 contained in the first memory module 806 in the channel (e.g., 806a in FIG. 9). The FSI-S 1304 outputs are connected to the next cascaded FSI-S 1304 inputs as depicted in FIG. 13. In an exemplary embodiment of the present invention, there is one FSI-S 1304 for each memory module 806 in the cascaded memory structure and the FSI-M 1302 is located externally to the memory modules 806 and the FSI-S(s) 1304 are located within the memory modules 806. In an exemplary embodiment of the present invention, the FSI-M 1302 and FSI-S(s) 1304 are connected by a FSI link made up of a bi-directional data wire 1308 and a clock wire 1306. Any cascaded service interface typology may be implemented by exemplary embodiments of the present invention. The cascaded FSI architecture depicted in FIG. 13 results in point to point service interface connections that enable high bandwidth service commands that perform the power on reset and initialization sequence in a system that supports a variable number of plugged memory modules 806. The service interface may also be utilized during run time for diagnostics and for monitoring errors.

Figure 14:
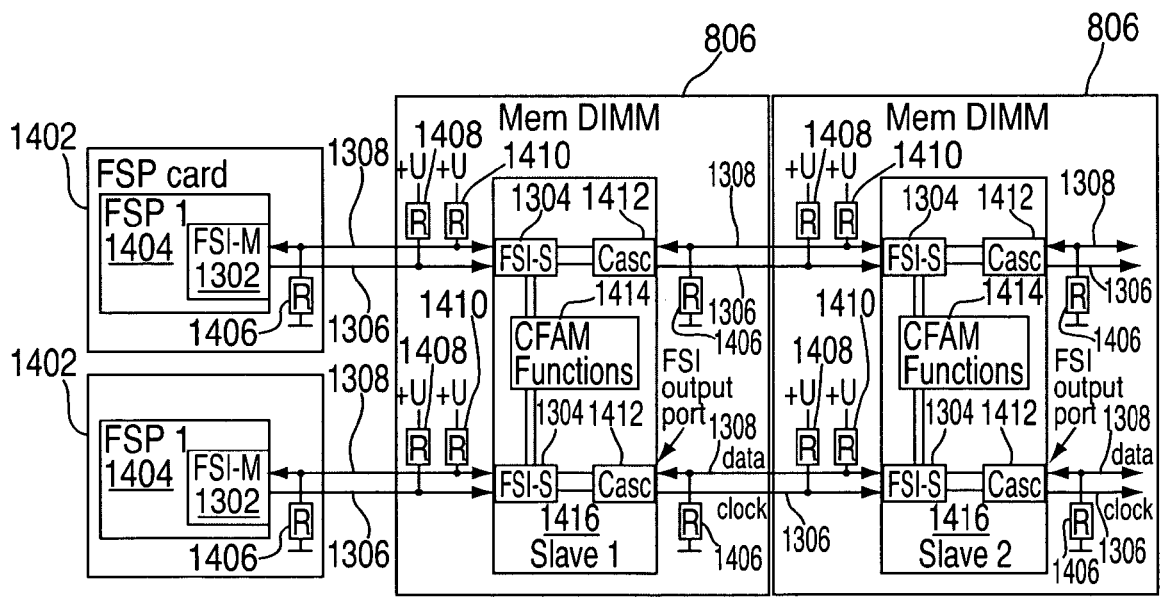
FIG. 14 depicts an exemplary embodiment of the present invention that includes two parallel field replaceable unit service interfaces (FSIs) connected in a cascade fashion to memory modules.

FIG. 14 depicts an exemplary embodiment of the present invention that includes two parallel FSI modules connected in a cascaded fashion to memory modules 806. The FSI-M's 1302 are located on FRU service processors (FSPs) 1404 that are located on FSP cards 1402. Connected to each bi-directional data wire 1308 is a ground resistor termination device 1406, as well as a pull up resistor termination device 1410. Another pull up resistor termination device 1408 is connected to the clock wire 1306. Each FSI-S 1304 is connected to a cascade logic 1412 to transmit data signals downstream on the bi-directional data wire 1308 and clock signals on the clock wire 1306 to the next FSI-S 1304 in the chain. In addition, the FSI cascade logic 1412 is utilized to receive data signals upstream on the bi-directional data wire 1308 from the next FSI-S 1304 in the chain. The FSI-S 1304 is also connected to common FRU access macro (CFAM) functions 1414 to determine which signals to utilize in the event that they contain different values. On each memory module 806, the FSI-Ss 1304, the FSI cascade logic 1412 and the CFAM function 1414 are located within CFAM logic block 1416 (e.g., "slave 1 ", "slave 2 ").

The point to point connections of the service interface depicted in FIG. 14 allow for high speed signaling and result in high bandwidth service commands. The dual FSI links (i.e., the bi-directional data wire 1308 and clock wire 1306) carry identical information and they are compared by voting logic within the CFAM logic block 1416. When an error is detected in one FSI transmission, the correct information from the alternate FSI interface is used. This redundancy may result in very high reliability. The FSI cascade logic 1412 re-drives the signals from the FSI-M 1302, thereby eliminating the need for additional external active circuits to support service interfaces to the memory modules 806.

Figure 15:
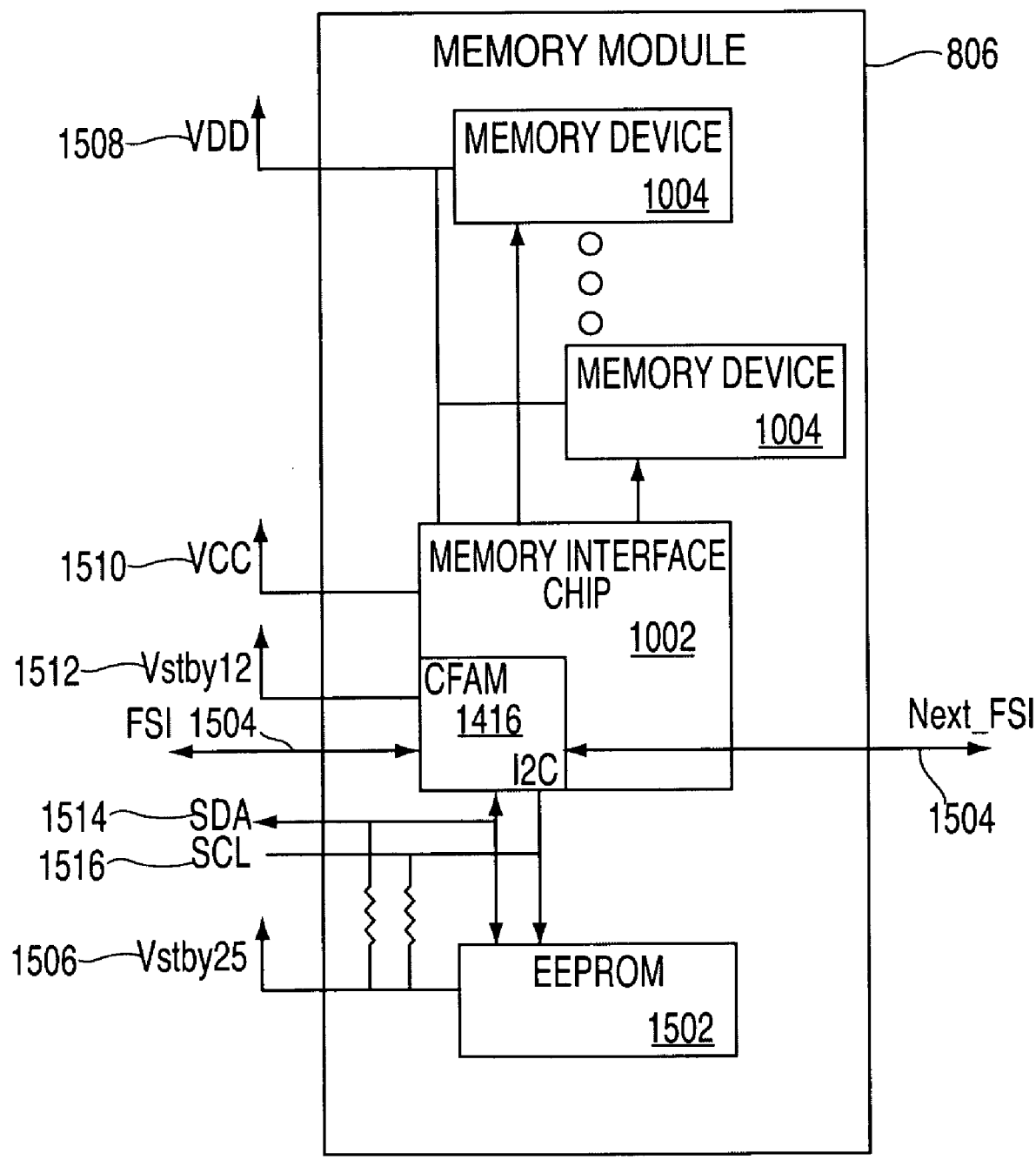
FIG. 15 depicts a memory module that includes common field replaceable unit access macro (CFAM) logic and a service interface in accordance with exemplary embodiments of the present invention.

The ground resistor termination device 1406, as well as the pull up resistor termination device 1410, improve electrical performance and support a plug detection capability. The values of the pull up resistor termination device 1410 and the ground resistor termination device 1406 on the FSI data signal are chosen such that when a memory module 806 is plugged in, a logic level of "1" can be detected. When a memory module 806 is not plugged in, a logic level of "0" can be detected. During power on reset and initialization of the buffered memory modules 806, an FSI topology sense and identification operation will be performed. During the FSI topology sense and identification procedure, the FSI-M 1302 performs plug detection on its data output net. If an FSI-S 1304 device is found (i.e., by sampling a logic "1"), the FSI-M 1302 will assign an identification value to the CFAM logic block 1416 labeled "slave 1" and enable the cascade logic on "slave 1." With the cascade logic enabled, the FSI-M 1302 can then perform plug detection on the "slave 1" output port data signal. If an FSI-S 1304 device is found (i.e., by sampling a logic "1"), the FSI-M 1302 will assign an identification value to the CFAM logic block 1416 labeled "slave 2" and enable the cascade logic on "slave 2." This process is repeated with other detected slave devices until a plug detection operation finds no further FSI-S 1304 devices cascaded onto the memory channel. After the FSI topology sense and identification operation has completed, all FSI-S 1304 devices will have unique identification values and will therefore be uniquely addressable by the FSI-M 1302, FIG. 15 depicts the memory module 806 that includes CFAM logic block 1416 in accordance with exemplary embodiments of the present invention. The memory module 806 includes memory devices 1004 and a memory interface chip 1002 (also referred to as a memory interface chip). The memory interface chip 1002 includes CFAM logic block 1416 which may be implemented via circuitry and/or software instructions. The CFAM logic block 1416 is in communication with the serial electrically erasable programmable read only memory (SEEPROM) 1502 in the memory module 806. The SEEPROM includes vital product data such as what memory devices 1004 are included on the memory module 806 and the memory capacity of the memory module 806. Several voltage rails are depicted in FIG. 15: a voltage rail for the memory devices (VDD) 1508 (e.g., at 1.8 volts); the memory interface chip 1002 core logic voltage rail (VCC) 1510 (e.g., at 1.2 volts); a CFAM logic block 1416 voltage rail (Vstby12) 1512; and a SEEPROM 1502 voltage rail (Vstby25) 1506.

The FSI input and output 1504 depicted in FIG. 15 includes both the data wire 1308 and the clock wire 1306. In an alternate exemplary embodiment, such as the one depicted in FIG. 14, there is also a backup FSI input and output 1504. The serial data (SDA) signal 1514 and serial clock (SCL) signal 1516 are used to communicate with the SEEPROM 1502 and may be sourced from the CFAM logic block 1416 or from other logic outside of the memory interface chip 1002. In an exemplary embodiment of the present invention, the SDA signal 1514 and SCL signal 1516 are inter-integrated circuit (I2C) signals. I2C nets on the memory interface chip 1002 may be connected to CFAM logic block 1416 and memory module 806 tabs, or pins. Alternatively, they may be connected to separate memory module 806 tabs. If connected to separate memory module 806 tabs, the high levels of assembly may provide a connection between the I2C portion of the CFAM logic block 1416 and the SEEPROM 1502, for example by routing wires between the appropriate memory module 806 connector pins.

Figure 16:
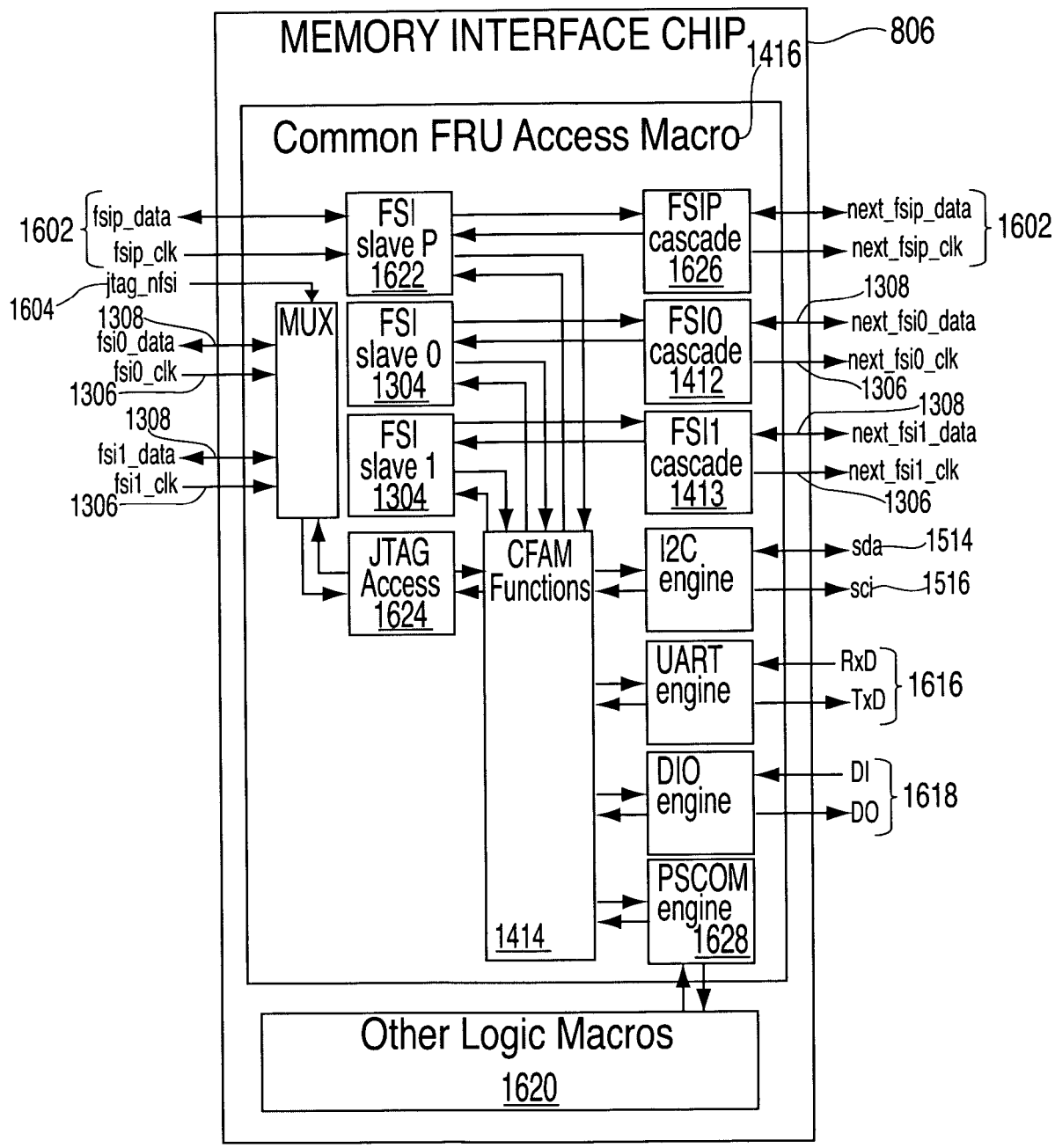
FIG. 16 depicts service interface logic in accordance with exemplary embodiments of the present invention.

FIG. 16 depicts service interface logic in accordance with exemplary embodiments of the present invention that may be used in an alternate protocol mode of operation. By using jtag_nfsi input 1604 to control the circuitry in the CFAM logic block 1416, the JTAG mode can be selected. This allows the flexibility to choose the service interface protocol. In a similar manner, other service interface protocols may also be implemented by exemplary embodiments of the present invention.

FIG. 16 also depicts an optional, additional service interface port for inputting data and clock signals 1602 into FSI port (FSI-P) logic 1622. This additional port, data and clock signals 1602, and corresponding FSI-P logic 1622 may or may not have the redundant copy like FSI-S data wire 1308, clock wire 1306 and CFAM logic block 1416 depicted in FIG. 16, and described previously. The additional port allows multiple service interface masters to control the buffered memory modules 806. This can be very beneficial in memory subsystems that desire both service processor control, as well as memory controller service interface control. The combination of the two features can be used to allow a system with a JTAG debug port (which uses JTAG access logic 1624) along with a service interface connection to execute power on reset and initialization commands. The FSI-P logic 1622, FSI-S 1304 and JTAG access logic 1624 all have access to the CFAM functions 1414.

In an exemplary embodiment of the present invention, the CFAM functions 1414 include converting service interface commands received (e.g., via the data signal from in the data and clock signal 1602, the jtag_nfsi input 1604 and the data input on the data wire 1308) into alternate formats for devices located on or near the memory module 806. Examples include the SDA signal 1514 and SCL signal 1516 for output to an I2C device; universal asynchronous receiver transmitter (UART) signals 1616 and simple data input/output (DIO) signals 1618.

One of the capabilities provided by the CFAM functions 1414 in exemplary embodiments of the present invention is the ability to read and write accessible registers within the other memory module logic macros 1620. This may be done by utilizing a communications protocol between the CFAM functions 1414 and other mainline logic (e.g., the other memory module logic macros 1620). A parallel scan communications (PSCOM) protocol is created by a PSCOM engine 1628 contained in the CFAM logic block 1416. The information written in this fashion configures the buffered memory module 806 for operation which constitutes the initialization portion of the power on reset and initialization sequence.

Commands to the buffered memory module 806 that are part of the power on reset sequence are also communicated over the service interfaces by reading and writing special registers assigned to this purpose. These include, but are not limited to, commands to initiate a controller interface alignment procedure for the very high speed memory busses, commands to perform various self test operations (e.g., input/output built in self test (IOBIST), logic built in self test (LBIST), and memory card built in self test (MCBIST)), and commands to turn on error checking.

Figure 17:
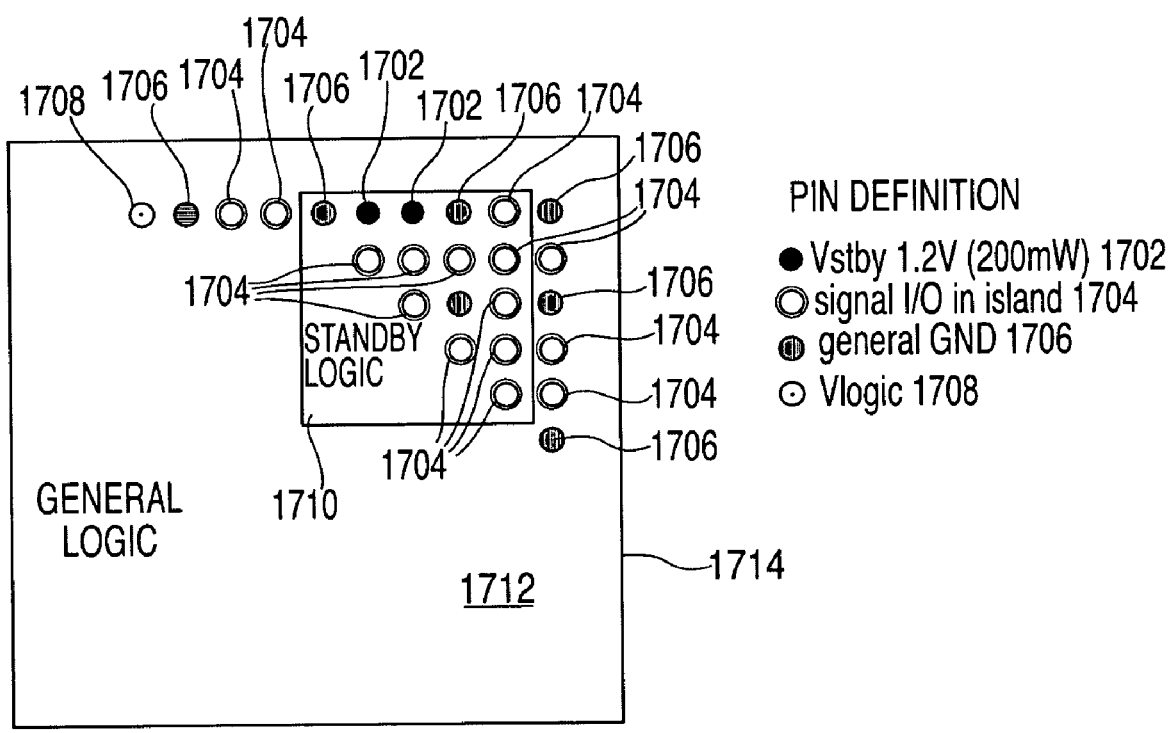
FIG. 17 depicts an exemplary pin arrangement that may be utilized by exemplary embodiments of the present invention.

FIG. 17 depicts an exemplary pin arrangement that may be utilized by exemplary embodiments of the present invention. The CFAM logic block 1416 may optionally be operated in its own voltage island, referred to in FIG. 17 as a standby logic 1710. This allows the CFAM logic block 1416 to use a standby voltage source (i.e., "Vstby 1.2V" 1702) from the system power supplies. As shown in FIG. 17, the power sources for the rest of the memory module 806 are in the portion referred to as a general logic 1712. The Vstby 1.2V pin 1702 applies power only to the CFAM logic block 1416 and a Vlogic pin 1708 applies power only to portions of the memory module 806 outside the CFAM logic block 1416. The signal I/O in island pin 1704 and general ground (GND) pin 1706. The combination of Vstby power and GND pins in the voltage island allow the drivers, receivers and other logic devices connected to the voltage island signal I/O to be powered on prior to and independently from the rest of the memory module.

Separating the power sources allows the CFAM logic block 1416 to be powered on earlier in the power on reset sequence and available for operation before the rest of the system (e.g., memory module 806 and memory subsystem) has been powered on. In this manner, the system can power on its standby power supplies, which supply power to the CFAM logic block 1416, as well as to the SEEPROM 1502 located on the memory module. Serial presence detect (SPD) operations from within the CFAM logic block 1416 can be performed, (as controlled by the service interface(s)) including reading data from the SEEPROM 1502 before the rest of the system has been powered on. SPD information can then be used to determine how and in what sequence to power on the rest of the memory subsystem.

Figure 18:
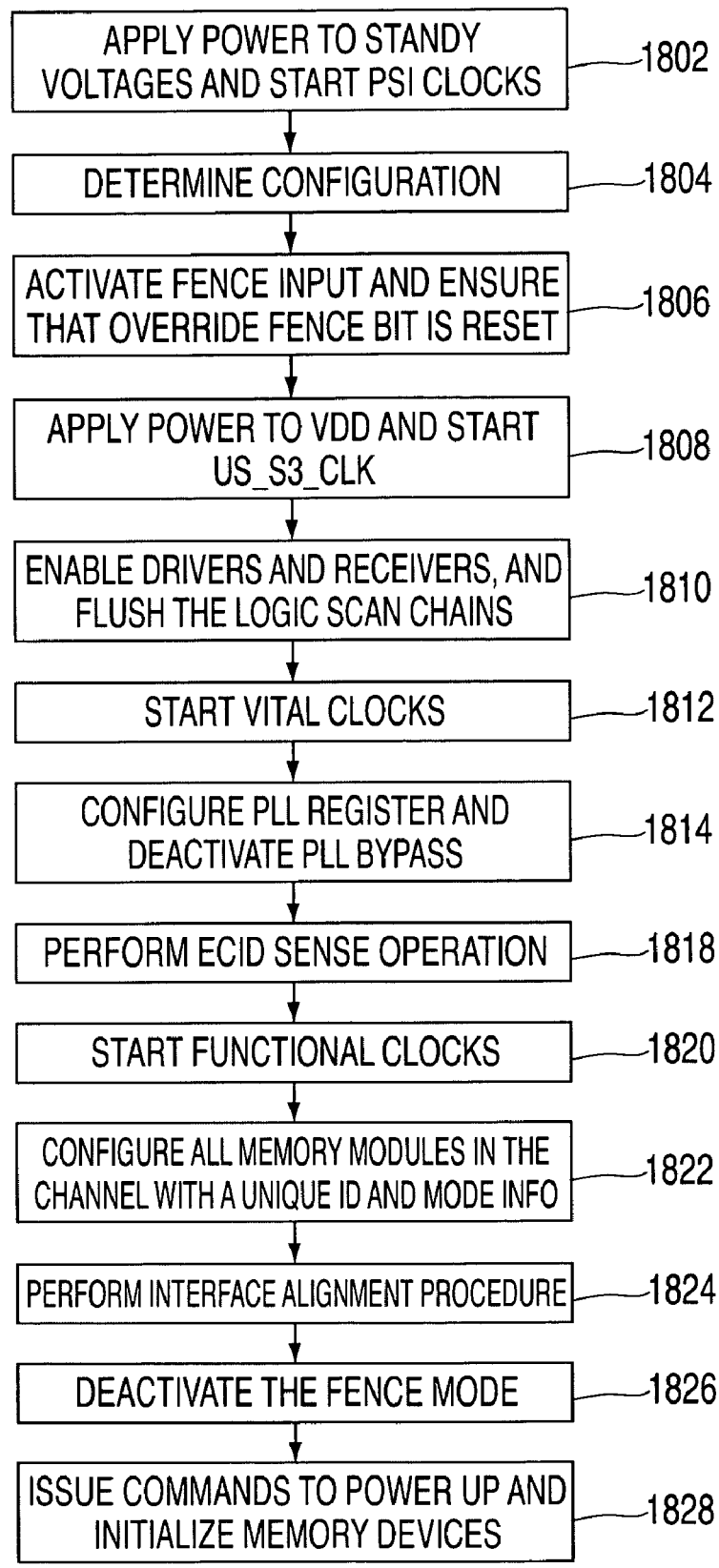
FIG. 18 depicts an exemplary power on reset process and initialization process that is utilized by exemplary embodiments of the present invention.

FIG. 18 depicts an exemplary power on reset process and initialization process for a memory subsystem that may be utilized by exemplary embodiments of the present invention. In an exemplary embodiment of the present invention, the performance of the steps depicted in FIG. 18 may be performed and/or directed by logic contained in the FSI-M 1302. In alternate exemplary embodiments of the present invention, the performance of one or more of the steps depicted in FIG. 18 may be performed and/or directed by logic contained in the FSI-S 1304, the memory controller 802 and/or an other external interface. At step 1802 in FIG. 18, power is applied to power up the CFAM logic block 1416 and the SEEPROM 1502 by powering up the system standby voltages (e.g., the Vstby 1.2V pin 1702) including any external standby voltages. In addition, the FSI-S 1304 clock and the FSI-P logic 1622 clock (if any) are started and maintained in a stable condition for a pre-determined number of cycles (e.g., two, five, and ten). At step 1804, the FSI-M 1302 executes SPD logic to determine what memory modules 806 are located in the memory subsystem. The FSI-M 1302 accesses the memory vital product data (for each memory module) located on the SEEPROM 1502 through the CFAM logic block 1416 in the memory interface chip or by a direct service processor I2C interface (e.g., via SDA signal 1514 and SCL signal 1516). The vital product data is utilized to determine the specific memory interface chip, memory configuration and mode setting(s) for each memory module 806 in the memory subsystem.

At step 1808, power is applied to the VDD 1508 to power up the general logic 1712 of the memory modules 806. In addition, the memory interface chip 1002 input signals that are pulled up or down, (e.g. jtag_nfsi) are ramped to their positive or negative values. Further, the clock for the memory subsystem that is sourced from the memory controller 802 is started and maintained in a stable condition for a pre-determined number of cycles (e.g., two, five, and ten). At step 1810, the memory interface chip 1002 drivers and receivers are enabled by programming the appropriate internal configuration bits. Also at step 1810, a command is issued to reset all memory interface chip latches (e.g. by flushing zeros into the memory module 806 logic scan chains).

Referring to step 1812 in FIG. 18, the memory module 806 clocks that are sourced from the memory buss interface clock, but do not pass through an internal phase locked loop, (PLL) are started by writing to the appropriate internal configuration register. At step 1814, the PLL mode register in the memory interface chip 1002 is configured and reset. A predetermined amount of time is waited for the PLL to lock. Optionally, the lock status is polled from an internal register. At step 1818, an optional electronic chip identification, (ECID) sense operation is performed to enable the ECID value of the memory interface chip 1002 to be read over the service interface. At step 1820, the memory interface chip 1002 internal, functional clocks sourced from the PLL are started are started by writing the appropriate clock control register.

At step 1822, all memory modules 806 in the channel, or in the memory subsystem, are configured with a unique identifier and other mode information. At step 1824, an interface alignment procedure is performed on the upstream memory bus 902 and the downstream memory bus 904. This calibrates and prepares the high speed memory busses for normal, system operation. At step 1826, the memory interface chip 1002 fence mode is de-activated allowing memory clocks to start and idle memory commands to be driven. This is done by setting the appropriate configuration register. At step 1828, commands to power up and initialize the memory devices 1004 are issued. In addition, an optional memory card built in self test, (MCBIST) sequence may also be executed. The memory module 806 is now ready for run time operation.

Exemplary embodiments of the present invention may be utilized to provide a service interface to cascaded memory subsystems. Portions of the memory module needed for power on reset and system initialization of the system may be powered on independently of the rest of the memory module. This capability allows the service interface to determine the number of memory modules included in the memory subsystem, as well as the memory capacity of the memory module in order to determine how much power to apply to the memory subsystem. Exemplary embodiments of the present invention interface to both a master service interface module (FSI-M), as well as other external sources of commands (e.g., a controller) and the slave service interface module (FSI-S). This provides flexibility in the types of commands and sources that can drive the service interface. Further, the ser vice interface can support both a JTAG protocol and a FSI protocol and can produce FSI; I2C, UART and DIO output signals. An additional benefit of exemplary embodiments of the present invention may be realized by providing a redundant service interface for each memory module in order to increase the reliability of the service interface.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing a service interface to a memory subsystem, the method comprising:

receiving an input signal at a slave service interface module in a cascaded interconnect system that includes a master service interface module for generating input signals and one or more slave service interface modules that are cascade interconnected by a bidirectional data wire and a clock wire of a service interface bus, each slave service interface module integrated on a corresponding memory module in a memory system that comprises one or more memory modules and a memory controller cascade interconnected by one or more memory busses for transmitting memory commands and memory data, wherein the service interface bus operates independently of and is physically separate from the memory busses, thereby providing a dedicated service interface to the memory system;

transmitting the input signal via the service interface bus in response to the receiving; and providing a service to the memory module in response to the input signal.

2. The method of claim 1 wherein the transmitting is to an other slave service interface module or to the master service interface module.

3. The method of claim 1 wherein the service includes power on reset.

4. The method of claim 1 wherein the service includes initialization.

5. The method of claim 1 wherein the service includes monitoring.

6. The method of claim 1 wherein the service includes diagnostics.

7. The method of claim 1 wherein the input signal is based on a joint test action group (JTAG) interface protocol.

8. The method of claim 1 wherein the input signal is converted to an inter-integrated circuit (I2C) signal, a universal asynchronous receiver transmitter (UART) signal, or a simple data input/output (DIO) signal prior to being transmitted.

* * * * *